E. A. PYE.
METHOD FOR MAKING TIRE FABRIC.
APPLICATION FILED FEB. 1, 1916.

1,217,879.

Patented Feb. 27, 1917.

Witnesses:

Inventor:
Ernest A. Pye,

UNITED STATES PATENT OFFICE.

ERNEST A. PYE, OF NEWARK, NEW JERSEY, ASSIGNOR TO MUSSELMAN CORD FABRIC COMPANY, OF CHICAGO, ILLINOIS, A CORPORATION OF SOUTH DAKOTA.

METHOD FOR MAKING TIRE FABRIC.

1,217,879.

Specification of Letters Patent. Patented Feb. 27, 1917.

Application filed February 1, 1916. Serial No. 75,548.

*To all whom it may concern:*

Be it known that I, ERNEST A. PYE, a subject of the King of Great Britain, residing at Newark, in the county of Essex and State of New Jersey, have invented a new and useful Improvement in Methods for Making Tire Fabric, of which the following is a specification.

The object of the present invention is to provide in the simplest and cheapest possible manner a fabric suitable for the manufacture of tires of the cord type and of various forms. This fabric, as is well known, consists of parallel strands, side by side, and for the most desirable method of tire fabrication the fabric should be provided in relatively narrow bands, the strands of which cross the band at rather a steep angle, the common angle being 45°. The strands are thus quite short. Such fabric has heretofore been made by taking the ordinary parallel strand fabric in a wide sheet and cutting it on the bias in a manner similar to that in which canvas is treated in cutting the bands commonly used in making fabric tires.

My method results in manufacturing substantially the same product but at enormous speeds and with the utmost accuracy and, furthermore, in supplying the fabric in pieces of great length, greater than can be obtained by cutting available widths of parallel strand fabric on the bias and with decreased waste.

Figure 1:
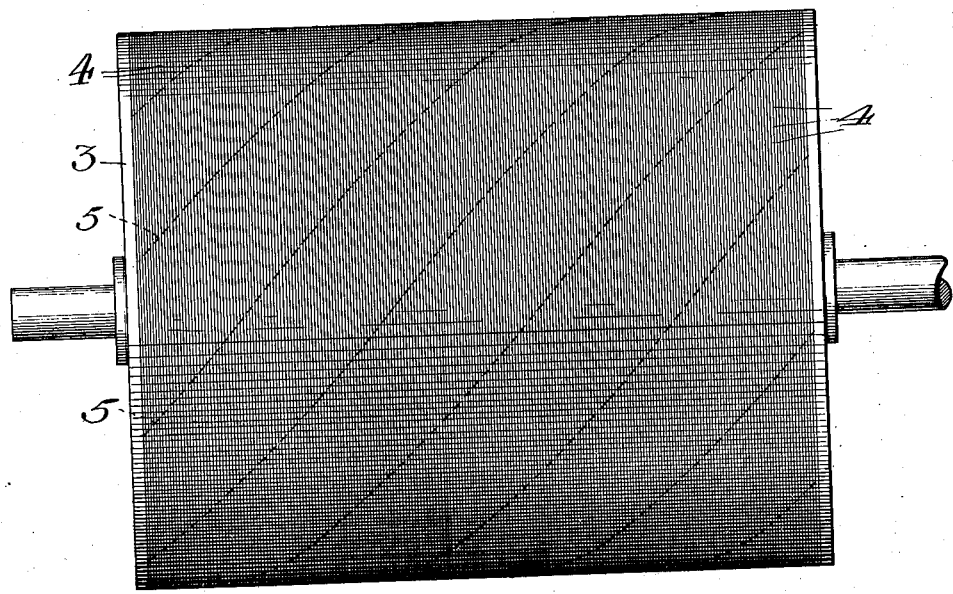
Figure 2:
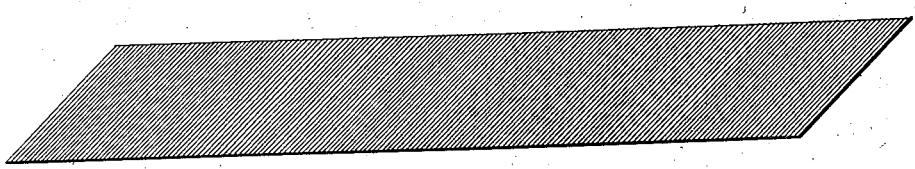

In the drawings, Figure 1 illustrates the method of procedure and Fig. 2 shows a completed band of fabric in which the strands lie at 45° to the length of the band.

Referring to the drawings, 3 is a cylindrical drum which is rotated in any desired manner, and may be rotated at very great speed. The thread or cord which is to form the strands of the fabric is wound upon this drum to form a single layer with the turns in close contact. In the practice of my invention I have found it convenient to guide this thread into place on the cylinder by hand, and I find that the cylinder may be covered at great speed after a little practice in guiding the thread. Of course, mechanical spooling means might be used, if desired, the only requisite being that the successive turns should lie smoothly upon the cylinder. When a single layer of thread is wound on the cylinder an adhesive, such as rubber, is thinly coated over the layer to hold the threads together in the parallel relation which they take on the drum. The thread coating is then cut into bands, the lines of the cuts taking a spiral direction on the drum. In the drawings, the lines 4 indicate the line of the threads, and the dotted lines 5, the direction of the cuts. These cuts can be made at any angle depending upon the direction which the threads are to occupy in the resultant bands of fabric. The drum may be made of any length, so that there is no practical limit to the length of the bands which can be produced. After the cuts are made the bands are taken off and are of the form shown in Fig. 2, and may be employed in fabricating tires in the ordinary way.

In the practice of my invention I prefer to use only a single layer of thread in the making of the fabric, but it is, of course, obvious that two or more layers might be wound onto the cylinder, the entire winding being secured together by an adhesive and the cuts made as described.

I realize that considerable variation is possible in the details of the procedure described and I do not intend to limit myself to this specific mode set forth, except as pointed out in the following claims.

What I claim as new and desire to secure by Letters Patent is:—

1. The herein described method of making tire fabric in which the tire fabric bands incorporate parallel strands crossing the bands diagonally which consists in winding the thread or cord upon the rotating drum with the successive turns in close proximity and parallel to each other, fixing the relative positions of the successive turns and cutting through the winding on a line running spirally along the drum to form bands in which the threads of the winding lie at the desired angle.

2. The herein described method of forming bands of tire fabric in which bands are incorporated parallel threads crossing the band at an angle which consists in winding upon the drum a thread or cord with its turns parallel and in close proximity, securing the turns together in fixed relative relation and cutting through the winding with parallel cuts running spirally of the drum to form a plurality of bands in which the threads of the winding are diagonally disposed.

3. The herein described method of making fabric, which consists in winding a strand spirally on a drum with the convolutions in close relation, applying rubber cement in such manner as to practically embed the strands in a rubber sheet, and cutting the fabric on lines forming acute angles with the strand, thus forming bands having parallel threads on the bias.

4. The herein described method of making fabric, which consists in winding a strand helically on a drum with the convolutions united in close relation, and cutting the fabric on lines forming acute angles with the strand, thus forming bands having parallel threads on the bias.

In testimony whereof, I have hereunto set my hand this 26th day of January, 1916.

ERNEST A. PYE.

In presence of two subscribing witnesses:
GEORGE A. CHRITTON,
A. C. FISCHER.